United States Patent
Parkinen et al.

(10) Patent No.: US 7,526,184 B1
(45) Date of Patent: Apr. 28, 2009

(54) VIDEO RECORDING SYSTEM UTILIZING EXTERNAL VIDEO STORAGE TO RECORD STREAMING VIDEO DATA VIA AN ISOCHRONOUS INTERFACE

(75) Inventors: Ronald G. Parkinen, Lake Forest, CA (US); William B. Boyle, Lake Forest, CA (US)

(73) Assignees: Keen Personal Media, Inc., Lake Forest, CA (US); Keen Personal Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/560,722

(22) Filed: Apr. 28, 2000

(51) Int. Cl.
*H04N 5/91* (2006.01)

(52) U.S. Cl. .............................. 386/83; 386/95; 386/125

(58) Field of Classification Search .................... 386/1, 386/125, 126, 45, 46, 83, 4, 52; 348/14.04, 348/14.05, 584, 460, 553, 564, 563; 725/24, 725/2, 59, 63, 67, 68, 73, 78, 100, 110, 131, 725/133, 139, 141, 151, 153; *H04N 5/26, H04N 9/29, 7/14, 11/01, 9/74, 5/445, 5/44, H04N 7/00*
See application file for complete search history.

(56) References Cited

U.S. PATENT DOCUMENTS

| | | | |
|---|---|---|---|
| 5,027,400 A | | 6/1991 | Baji et al. |
| 5,241,428 A | * | 8/1993 | Goldwasser et al. ........ 386/109 |
| 5,432,769 A | | 7/1995 | Honjo |
| 5,754,730 A | | 5/1998 | Windrem et al. |
| 5,815,631 A | * | 9/1998 | Sugiyama et al. ............. 386/46 |
| 5,912,710 A | | 6/1999 | Fujimoto |
| 5,990,927 A | | 11/1999 | Hendricks et al. |
| 5,991,832 A | | 11/1999 | Sato et al. |
| 5,999,220 A | | 12/1999 | Washino |
| 6,016,507 A | | 1/2000 | Carroll et al. |
| 6,311,011 B1 | * | 10/2001 | Kuroda ........................ 386/46 |
| 6,430,363 B2 | * | 8/2002 | Sasaki et al. ................. 386/112 |
| 6,782,188 B1 | * | 8/2004 | Ido et al. ....................... 386/52 |

FOREIGN PATENT DOCUMENTS

DE 3106125 A1 * 12/1982

* cited by examiner

*Primary Examiner*—Huy T Nguyen
(74) *Attorney, Agent, or Firm*—Knobbe, Martens, Olson & Bear

(57) ABSTRACT

The present invention may be regarded as a video recording system and method of enabling the recording of an external video data stream for a video program segment selected using an electronic program guide. The video recording system comprises a user interface that receives user input, a video input interface that receives the external video data stream for the selected video program segment, an isochronous interface connectable to an external rotating storage drive, and a video data management system. The video data management system uses the electronic program guide to select the video program segment in response to the user input. The video data management system recognizes connection of the external rotating storage drive to the video recording system and subsequently identifies the external rotating storage drive as available for video data storage. The video data management system uses the external video data stream for the video program segment to provide streaming video data, and routes at least a portion of the streaming video data to the external rotating storage drive via the isochronous interface in order to record the external video data stream for the video program segment.

18 Claims, 4 Drawing Sheets

VIDEO RECORDING SYSTEM UTILIZING EXTERNAL VIDEO STORAGE TO RECORD STREAMING VIDEO DATA VIA AN ISOCHRONOUS INTERFACE

BACKGROUND OF THE INVENTION

1. Field of the Invention

The present invention relates to information storage and display systems utilizing rotating storage drives, and more particularly, to video recording systems that record streaming video data.

2. Description of the Related Art

Video recording systems, such as personal video recorders, typically utilize hard disk drive technology to store and replay video images. Such hard disk drive technology has traditionally been used in computer-related applications. By coupling the large, yet finite, storage capability (e.g., 15 GB or more) and non-volatile memory of an internal hard disk drive, and video compression and decompression capabilities, personal video recorders allow users to pause and resume live television or to observe instant-replay while continuing to record the same incoming video data stream. These capabilities are not provided by video cassette recorders that utilize magnetic tape storage, which is a sequential access medium (i.e., to jump from a particular stored video data stream to another, the tape must be advanced or rewound).

The storage space available for storing streaming video data in a personal video recorder is limited to the storage capacity of the internal hard disk drive within the personal video recorder itself. As such, once the storage capacity of the internal hard drive is completely filled with data, further video data storage requires rewriting over previously stored video data. Users can then only store an incoming video data stream at the cost of removing a previously stored video data stream.

There is, therefore, a need to provide the capabilities of video recording systems, while also providing the flexibility of adding storage capacity for video data streams.

SUMMARY OF THE INVENTION

The present invention may be regarded as a video recording system to record an external video data stream for a video program segment selected using an electronic program guide. The video recording system comprises a user interface that receives user input, a video input interface that receives the external video data stream for the selected video program segment, an isochronous interface connectable to an external rotating storage drive, and a video data management system. The video data management system uses the electronic program guide to select the video program segment in response to the user input. The video data management system recognizes connection of the external rotating storage drive to the video recording system and subsequently identifies the external rotating storage drive as available for video data storage. The video data management system uses the external video data stream for the video program segment to provide streaming video data, and routes at least a portion of the streaming video data to the external rotating storage drive via the isochronous interface in order to record the external video data stream for the video program segment.

The present invention may also be regarded as a method of enabling the recording of an external video data stream for a video program segment selected using an electronic program guide. The method receives user input by a video recording system that comprises an isochronous interface connectable to an external rotating storage drive. The method receives the external video data stream for the selected video program segment by the video recording system, and uses the electronic program guide to select the video program segment in response to the user input. The method recognizes connection of the external rotating storage drive and subsequently identifies the external rotating storage drive as available for video data storage, and uses the external video data stream for the video program segment to provide streaming video data. The method routes at least a portion of the streaming video data to the external rotating storage drive via the isochronous interface in order to record the external video data stream for the video program segment.

DETAILED DESCRIPTION OF THE PREFERRED EMBODIMENT

Figure 1:
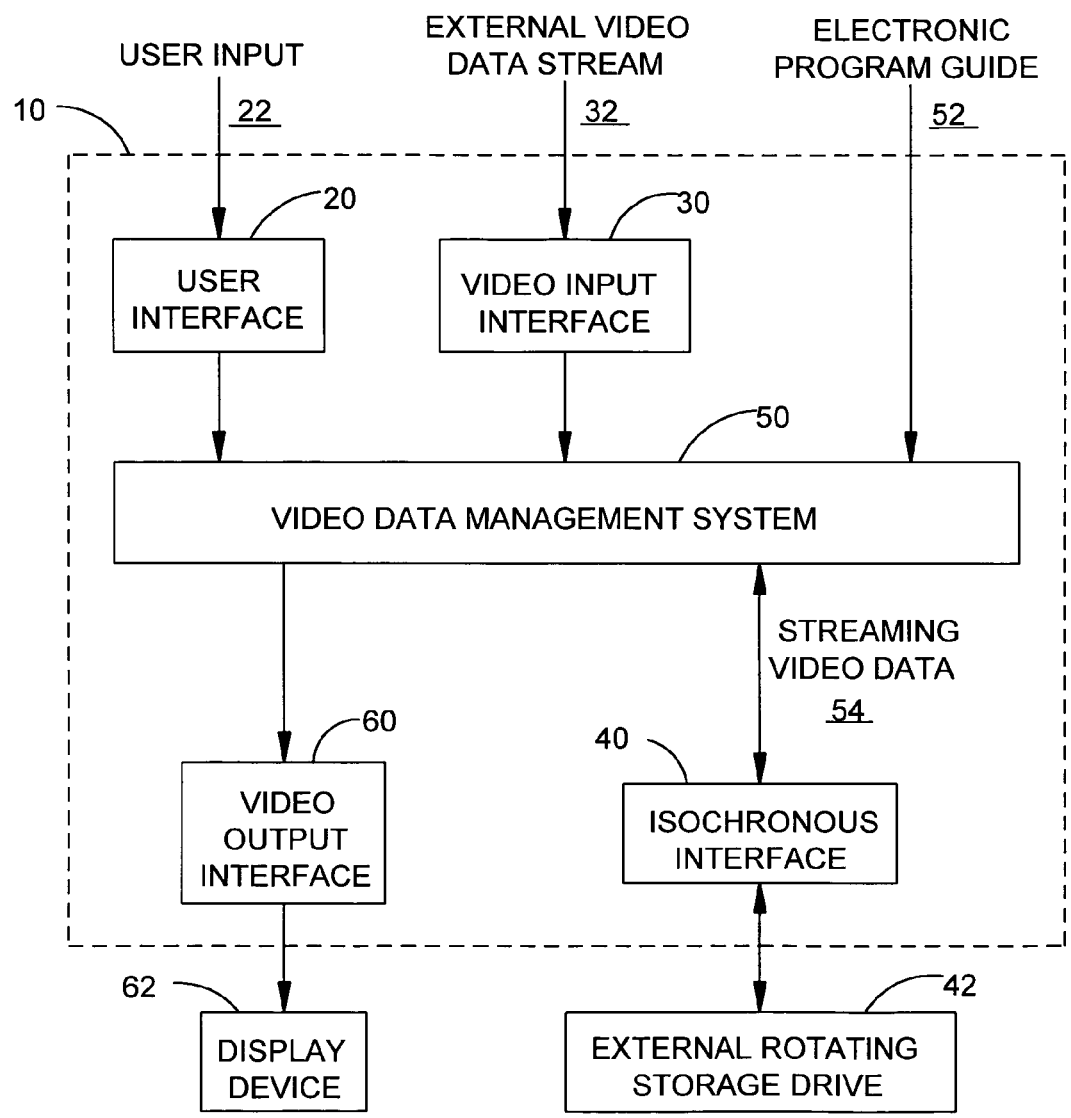
FIG. 1 schematically illustrates a video recording system in accordance with an embodiment of the present invention that includes a video data management system that uses an external video data stream for a video program segment to provide streaming video data, and that routes at least a portion of the streaming video data to an external rotating storage drive via an isochronous interface in order to record the external video data stream for the video program segment.

FIG. 1 schematically illustrates a video recording system 10 in accordance with an embodiment of the present invention. The video recording system 10 comprises a user interface 20 that receives user input 22, a video input interface 30 that receives an external video data stream 32 for a selected video program segment 34, an isochronous interface 40 connectable to an external rotating storage drive 42, and a video data management system 50. Preferably, the isochronous interface 40 is compatible with asynchronous communication, as well as with isochronous communication. The video data management system 50 uses an electronic program guide 52 to select the video program segment 34 in response to the user input 22, recognizes connection of the external rotating storage drive 42 to the video recording system 10 and subsequently identifies the external rotating storage drive 42 as available for video data storage. The video data management system 50 uses the external video data stream 32 for the video program segment 34 to provide streaming video data 54, and routes at least a portion of the streaming video data 54 to the external rotating storage drive 42 via the isochronous interface 40 in order to record the external video data stream 32 for the video program segment 34. Output from the video recording system 10 is routed via a video output interface 60 to a display device 62, typically a television, which is viewed by a user.

By receiving user input 22, the user interface 20 permits the user to indicate to the video recording system 10 which video program segments 34 are selected for recording from the external video data stream 32, as well as to control various other operation parameters of the video recording system 10, such as playback commands (e.g., pause, instant-replay, etc.). In one embodiment of the present invention, the user interface 20 comprises a remote control keypad device (not shown) which emits infrared radiation encoded to signal the selections of the user, and an infrared receiver coupled to the video recording system 10 to receive the encoded signals of the user input 22. By pressing various keys on the remote control keypad device, the user communicates which video program segments 34 are selected to the video recording system 10. Alternatively, or in addition, the user interface 20 can advantageously comprise a keypad wired directly to the video recording system 10, or can utilize another known communication technology to enable a user to provide the user input 22 to the video recording system 10. The user interface 20 is coupled to the video data management system 50 in order to communicate the user input 22 to the video data management system 50, which selects the video program segment 34 in response to the user input 22. Persons skilled in the art are able to select an appropriate remote control or keypad communication technology for the user interface 20 to receive the user input 22.

In one embodiment of the present invention, the video input interface 30 receives an external video data stream 32 from a multiple-service operator, also known as an MSO. MSOs are video data service providers that supply video programming to multiple users. Examples of MSOs include, but are not limited to, cable television systems and satellite systems. Alternatively, the external video data stream 32 can be received from UHF or VHF broadcast signals using an antenna.

The video input interface 30 is configured to ensure that the external video data stream 32 received by the video input interface 30 has a format which is compatible with by the video data management system 50. For example, to provide compatibility of the video recording system 10 with an analog-formatted external video data stream 32, the video input interface 30 of one embodiment comprises an MPEG (Motion Pictures Experts Group) encoder, which generates a compressed digitally-formatted data stream in response to the analog-formatted external video data stream 32, and communicates the compressed digitally-formatted data stream to the video data management system 50. In addition, less storage capacity is required to record the compressed digitally-formatted data stream than the analog-formatted external video data stream 32. Furthermore, for particular embodiments that are compatible with an encrypted external video data stream 32 (e.g., video data streams from premium cable channels), the video input interface 30 comprises a decrypter. Alternatively, in other embodiments of the present invention, the encoding and decrypting features described above may instead be performed by the video data management system 50, or by some other device upstream of the video recording system 10. Persons skilled in the art are able to provide a video input interface 30 that receives and appropriately responds to the external video data stream 32 in a manner in accordance with the present invention.

In one embodiment of the present invention, the isochronous interface 40 is coupled to the video data management system 50 in order to receive the streaming video data 54 corresponding to the external video data stream 32 for the video program segment 34 to be recorded. In addition, the isochronous interface 40 communicates various video data management commands from the video data management system 50 to the external rotating storage drive 42. In certain embodiments of the present invention, the isochronous interface 40 is compatible with the IEEE 1394 standard, which is described in the "IEEE Std 1394-1995 IEEE Standard for a High Performance Serial Bus," Aug. 30, 1996, which is incorporated by reference herein.

In particular embodiments of the present invention, the isochronous interface 40 includes capabilities to encrypt the streaming video data 54 before it is recorded onto an external rotating storage drive 42 to provide protection from unauthorized copying or transporting of stored video data by exchanging external rotating storage drives 42 between different video recording systems 10. Alternatively, in other embodiments, the isochronous interface 40 is capable of applying DTLA ("Digital Transmission Licensing Administrator") copy protection utilizing authentication key exchange to the video data routed to the external rotating storage drive 42. DTLA copy protection is a well-known copy protection system, compatible with the IEEE 1394 standard, and is described in "Digital Transmission Content Protection Specification Revision 1.0," Mar. 17, 1999, which is incorporated by reference herein. By applying DTLA copy protection to the video data routed to the external rotating storage drive 42, the routed video data is protected from unauthorized copying.

The preferred embodiment of the present invention is connectable via the isochronous interface 40 to an external rotating storage drive 42 that is an external hard disk drive compatible with the IEEE 1394 standard. Alternatively, the external rotating storage drive 42 can be a writable digital video disk (DVD) drive, or another technology that provides writable non-volatile storage.

In embodiments which utilize an isochronous interface 40 and external rotating storage drives 42 that are compatible with the IEEE 1394 standard, up to 1023 bus segments may be connected together, with up to 63 external rotating storage drives 42 daisy-chained to each bus segment. Additionally, a full storage drive 42 can be disconnected and replaced with an empty storage drive 42. Thus, video recording systems compatible with the IEEE 1394 standard provide nearly unlimited storage capacity.

In the embodiment illustrated in FIG. 1, the electronic program guide 52 is a database containing information regarding the broadcast schedules for various video program segments from various broadcast channels. This information is typically expressed in the form of a program grid with columns denoting the time periods, and with separate rows for each of the available broadcast channels. In one embodiment, the information of the electronic program guide 52 is communicated to the video data management system 50 via a separate input channel (e.g., via a phone line connection between the source of the electronic program guide 52 and the video recording system 10). Alternatively, in other embodiments of the present invention, the information of the electronic program guide 52 is communicated to the video data management system 50 via the isochronous interface 40. In addition, the information of the electronic program guide 52 is temporarily stored in memory by the video data management system 50 in particular embodiments. Typically, in order to enable a user to utilize the information of the electronic program guide 52, the video data management system displays the program grid directly on the display device 62 being viewed by the user. The user may then provide appropriate user input 22 to the video data management system 50 via the user interface 20. The video data management system 50 then uses the electronic program guide 52 to select the external video data stream 32 for the video program segment 34 in response to the user input 22. Persons skilled in the art are able to select an appropriate configuration of the electronic program guide 50 and the method of communicating its information to both the user and the video data management system 50 compatible with the present invention.

In the embodiment illustrated in FIG. 1, the video data management system 50 recognizes connection of an external rotating storage drive 42 to the video recording system 10 and subsequently identifies the external rotating storage drive 42 as available for video data storage. The isochronous interface 40 enables communication between the video data management system 50 and any external rotating storage drives 42 connected to the video recording system 10. Using information generated by the external rotating storage drives 42 and communicated via the isochronous interface 40, the video data management system 50 is able to recognize connection of and to identify as available the external rotating storage drives 42. In certain embodiments, the communication between the video data management system 50 and any external rotating storage drives 42 occurs upon connection of the external rotating storage drive 42 to the video recording system 10, thereby providing automatic recognition of the external rotating storage drive 42 in accordance with the IEEE 1394 standard. Persons skilled in the art are able to provide an appropriate configuration and communication scheme between the video data management system 50 and the external rotating storage drives 42 compatible with the present invention.

In the embodiment illustrated in FIG. 1, the video data management system 50 uses the external video data stream 32 for the video program segment 34 to provide streaming video data 54. Where the external video data stream 32 for the video program segment 34 is already in a format compatible with storage on an external rotating storage drive 42 via the isochronous interface 40, the video data management system provides streaming video data 54 which is unchanged from the external video data stream 32. Alternatively, where the external video data stream 32 is not in a compatible format, the video data management system 50 provides streaming video data 54 which comprises some conversion (e.g., encoding or encryption). In alternative embodiments, this conversion may be performed by the isochronous interface 40.

In the embodiment illustrated in FIG. 1, the video data management system 50 routes at least a portion of the streaming video data 54 to the external rotating storage drive 42 via the isochronous interface 40 in order to record the external video data stream 32 for the video program segment 34. In embodiments in which the video recording system 10 comprises an internal rotating storage drive, such as a hard disk drive, the video data management system 50 selectively routes portions of the streaming video data 54 among the internal rotating storage drive and the connected external rotating storage drives 42, depending on the storage availability of the various drives.

Figure 2:
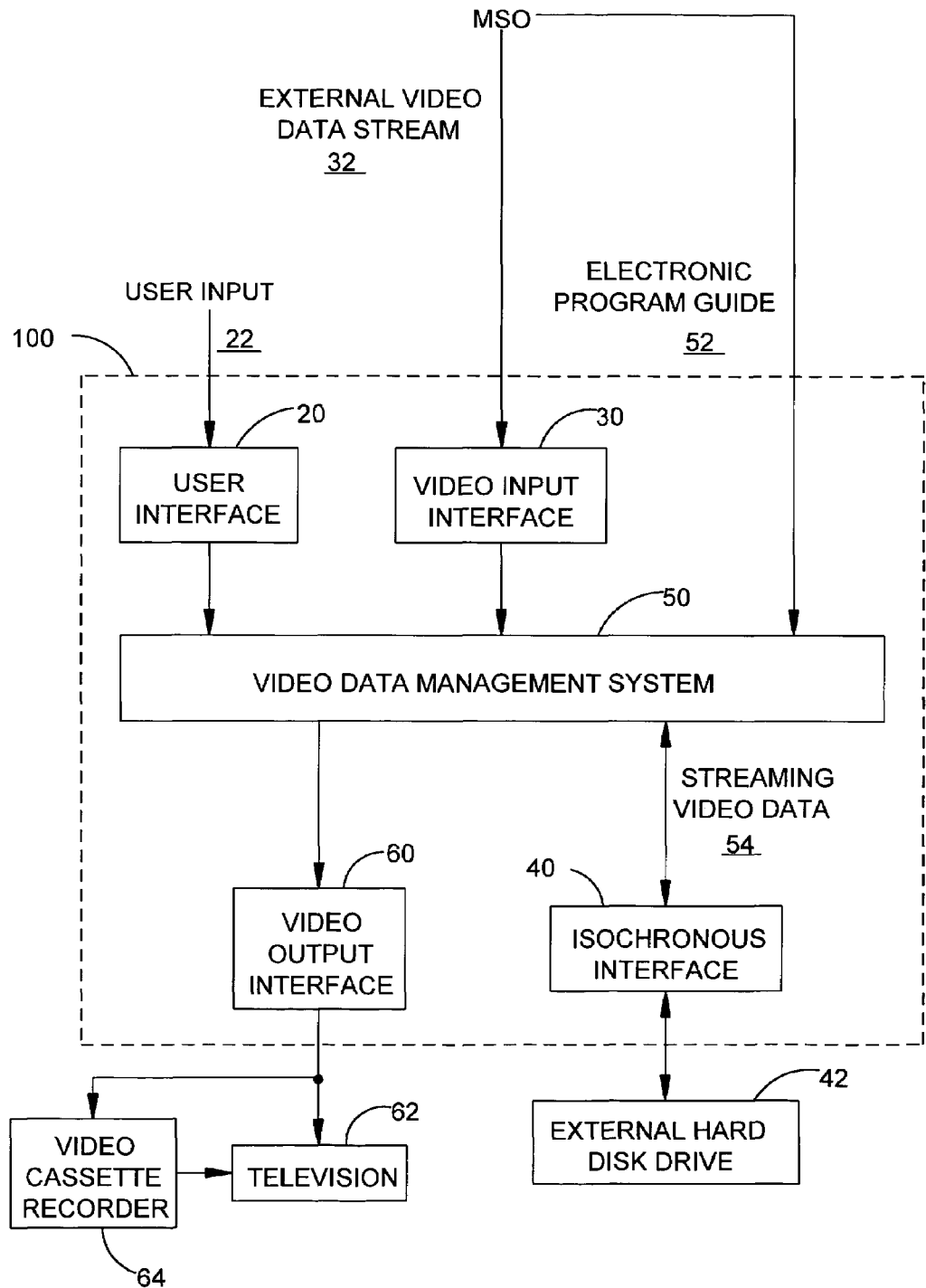
FIG. 2 schematically illustrates an exemplary embodiment of the present invention wherein the video recording system further comprises a set-top box that receives the external video data stream from a multiple-service operator.

FIG. 2 schematically illustrates an exemplary embodiment of the present invention wherein the video recording system 10 further comprises a set-top box 100 that receives an external video data stream 32 from a multiple-service operator (MSO). A set-top box is a known device typically used to receive user input 22 via a user interface 20, to receive an external video data stream 32 from an MSO via a video input interface 30, and to provide an output video data stream in response to the external video data stream 32. The output video data stream of a known set-top box is typically configured to be compatible with other video devices which may be coupled to the set-top box, such as video cassette recorders and televisions. Providing a set-top box 100, as illustrated in FIG. 2, with a video data management system 50, an isochronous interface 40, and a video output interface 60 in accordance with the present invention, provides an embodiment with the capabilities of known set-top boxes, while also providing the capabilities of the present invention.

FIG. 2 also illustrates an external hard disk drive serving as an external rotating storage drive 42 coupled to a particular embodiment of the present invention. When coupled to a video recording system 10 in accordance with the present invention, the external hard disk drive provides storage capability which is not found in known set-top boxes. In addition, the video output interface 60 in FIG. 2 is coupled to both a television as a display device 62 and a video cassette recorder 64. The video output interface 60 of the illustrated embodiment is configured to provide compatibility with such video equipment already in existence.

Figure 3:
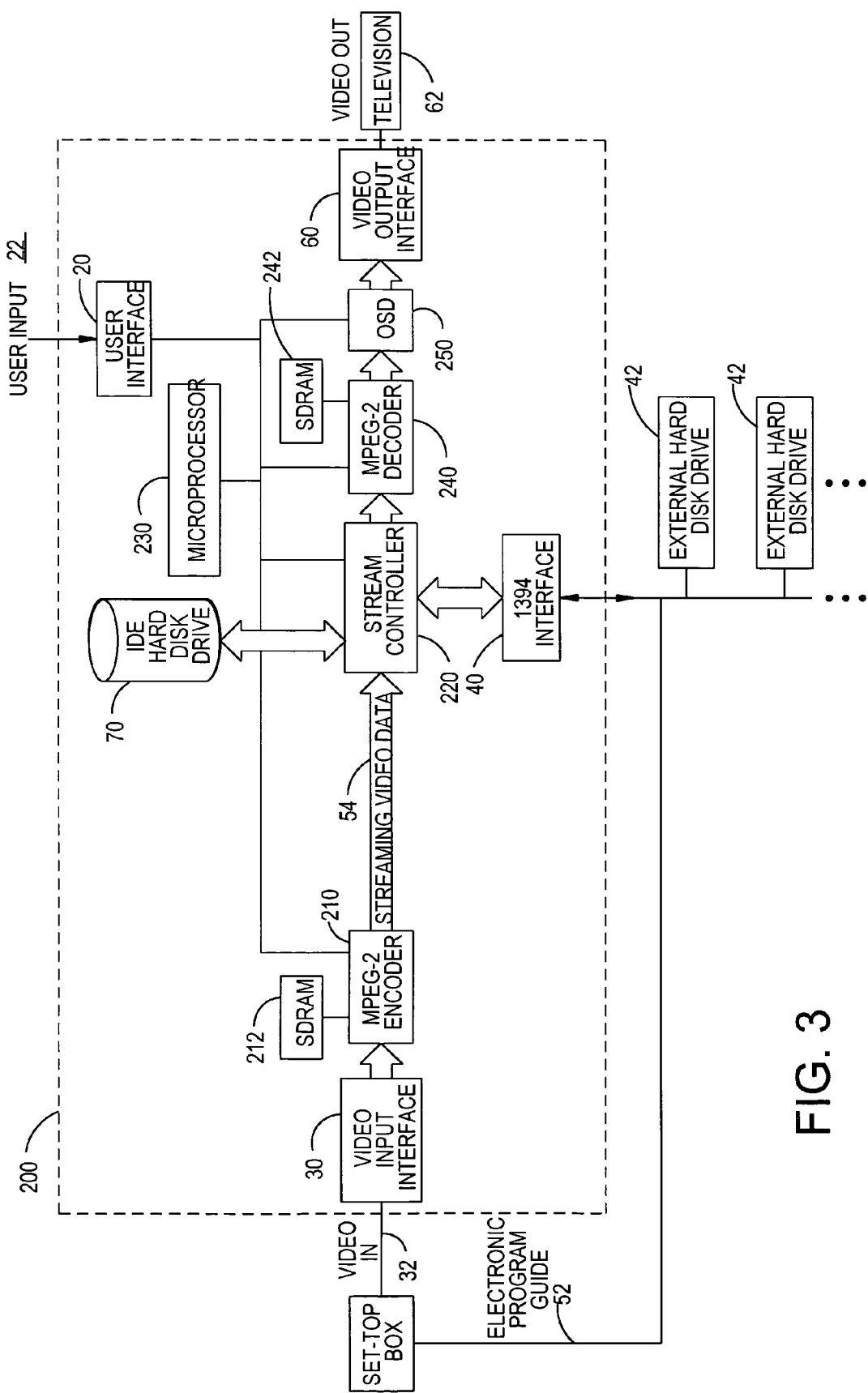
FIG. 3 schematically illustrates another exemplary embodiment of the present invention wherein the video recording system further comprises a personal video recorder with an internal hard disk drive, and which is coupled to multiple external hard disk drives.

FIG. 3 schematically illustrates a specific embodiment of the present invention wherein the video recording system 10 further comprises a personal video recorder 200 comprising a user interface 20, a video input interface 30, an isochronous interface 40, a video data management system 50, a video output interface 60, and an internal hard disk drive 70. The video data management system 50 comprises an encoder 210 coupled to a respective SDRAM memory 212, a stream controller 220, a microprocessor 230, a decoder 240 coupled to a respective SDRAM memory 242, and an on-screen graphics driver (OSD) 250. In the embodiment illustrated in FIG. 3, the microprocessor 230 controls the operation of the personal video recorder 200 by communicating with the other various components of the personal video recorder 200.

The user interface 20 of the embodiment illustrated in FIG. 3 comprises an infrared receiver coupled to an infrared remote control keypad device and the video data management system 50. As described generally in the discussion of FIG. 1, the user interface 20 receives user input 22, permitting the user to indicate to the personal video recorder 200 which video program segments 34 are selected for recording from the external video data stream 32, as well as to control various other operation parameters of the personal video recorder 200.

The video input interface 30 of the embodiment illustrated in FIG. 3 is coupled to a set-top box and receives the external video data stream 32 for the selected video program segment 34 and is coupled to the video data management system 50 via the encoder 210. The encoder 210 compresses (i.e., encodes) the video data stream from the video input interface 30 using the MPEG-2 compression technique, which is a known video data compression standard. The compressed video data stream is then communicated to the stream controller 220 as streaming video data 54 in the format of an MPEG single program transport stream. In an alternative embodiment of the present invention, the encoder 210 is compatible with other compression techniques, including, but not limited to, wavelet compression, motion JPEG compression, and DV25 compression. In the embodiment illustrated in FIG. 3, the encoder 210 also utilizes a SDRAM memory 212.

In addition, in the embodiment illustrated in FIG. 3, the electronic program guide 52 is received from the set-top box via the isochronous interface 40, and is communicated to the microprocessor 230 and the on-screen graphics driver 250. The microprocessor 230 uses the electronic program guide 52 to select the video program segment 34 in response to the user input 22.

The isochronous interface 40 of the embodiment illustrated in FIG. 3 is compatible with the IEEE 1394 standard and is coupled to the video data management system 50 via the stream controller 220. In addition, as illustrated in FIG. 3, the isochronous interface 40 is connectable to multiple IEEE 1394-compatible external hard disk drives 42. The microprocessor 230 recognizes connection of the external hard disk drives 42 and subsequently identifies the external hard disk drives 42 as available for video data storage.

The video output interface 60 of the embodiment illustrated in FIG. 3 is coupled to the video data management system 50 via the decoder 240 and the on-screen graphics driver 250. The decoder 240 performs the inverse function of the encoder 240. By generating a video data stream that is compatible with display on the television 62, the decoder 240 enables the display of stored video data streams from the various storage drives coupled to the personal video recorder 200. In the embodiment illustrated in FIG. 3, the decoder 240 also utilizes a SDRAM memory 242.

The on-screen graphics driver 250 generates a graphical representation of the electronic program guide 52 and other control parameters of the personal video recorder 200, which is displayed on a television 62 via the video output interface 60. Responding to the displayed graphical representation, the user may indicate to the personal video recorder 200 which video program segments 34 are selected for recording from the external video data stream 32, as well as to control various other operation parameters of the personal video recorder 200.

The internal hard disk drive 70 of the embodiment illustrated in FIG. 3 is coupled to the video data management system 50 via the stream controller 220. The internal hard disk drive 70 in FIG. 3 comprises an IDE ("integrated drive electronics") interface, which is a known interface for mass storage devices in which the controller is integrated into the storage drive. Because IDE-compatible hard disk drives and IEEE 1394-compatible hard disk drives are not connectable to the same bus, the internal IDE hard disk drive 70 and the multiple IEEE 1394-compatible external hard disk drives 42 are coupled to the video data management system 50 via separate buses.

Pursuant to commands from the microprocessor 230 of the embodiment illustrated in FIG. 3, the stream controller 220 routes at least a portion of the streaming video data 54 to the external rotating storage drives 42 via the isochronous interface 40 in order to record the external video data stream 32 for the video program segment 34. Also, the stream controller 220 routes at least a portion of the streaming video data 54 to the internal hard disk drive 70.

Figure 4:
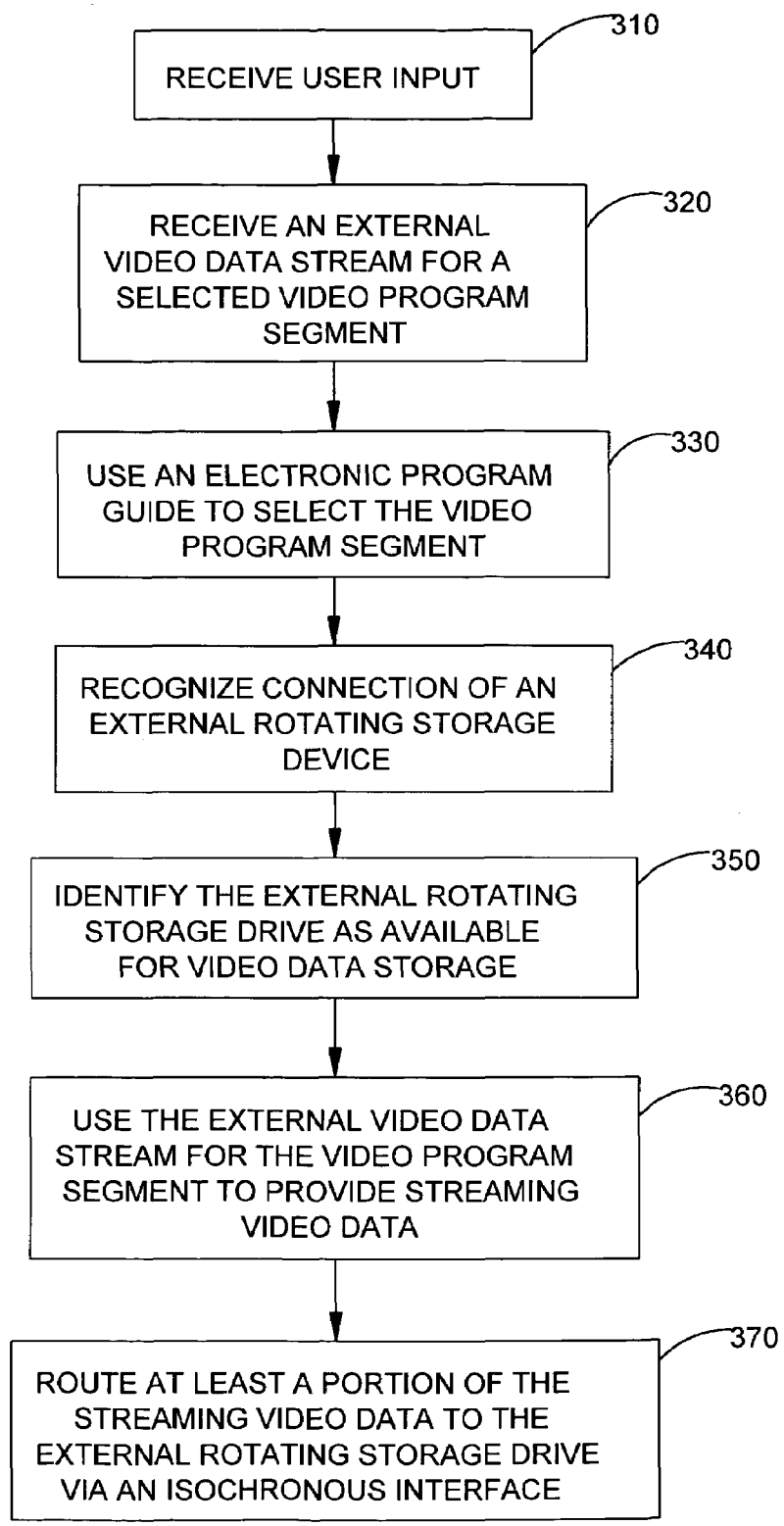
FIG. 4 is a flow diagram in accordance with an embodiment of the present invention that uses an external video data stream for a video program segment to provide streaming video data, and routes at least a portion of the streaming video data to an external rotating storage drive via an isochronous interface in order to record the external video data stream for the video program segment.

FIG. 4 is a flow diagram in accordance with an embodiment of the present invention that uses an external video data stream 32 for a video program segment 34 to provide streaming video data 54, and routes at least a portion of the streaming video data 54 to an external rotating storage drive 42 via an isochronous interface 40 in order to record the external video data stream 32 for the video program segment 34. The flow diagram is described with reference to the video recording system 10 illustrated in FIG. 1. Persons skilled in the art are able to recognize that, while the flow diagram illustrates a particular embodiment with steps in a particular order, other embodiments with different order of steps are also compatible with the present invention.

In a step 310, user input 22 is received by a video recording system 10 that comprises an isochronous interface 40 connectable to an external rotating storage drive 42. In the preferred embodiment of the present invention, the video recording system 10 further comprises a user interface 20 which is coupled to a video data management system 50. The user input 22 is received by the user interface 20 and is communicated to the video data management system 50 for the steps described below.

Proceeding to a step 320, a video input interface 30 coupled to the video data management system 50 receives an external video data stream 32 for the selected video program segment 34. The external video data stream 32 is communicated to the video data management system 50 for the steps described below.

Proceeding to a step 330, an electronic program guide 52 is used by the video data management system 50 to select the video program segment 34 in response to the user input 22. The electronic program guide 52 is communicated to the user by displaying the information on a display device 62 via a video output interface 60. The user then indicates the selected video program segment 34 by generating appropriate user input 22. Using the received user input 22, the video data management system 50 selects the video program segment 34 to be recorded.

Proceeding to a step 340, the video data management system 50 recognizes connection of the external rotating storage drive 42 via the isochronous interface 40. Preferably, step 340 occurs automatically upon coupling the external rotating storage drive 42 to the isochronous interface 40.

Proceeding to a step 350, the video data management system 50 identifies the external rotating storage drive 42 as available for video data storage. This step 350 is achieved by communication between the video data management system 50 and the external rotating storage drive 42 which indicates the amount of available storage capacity of the external rotating storage drive 42.

Proceeding to a step 360, the video data management system 50 uses the external video data stream 32 for the video program segment 34 to provide streaming video data 54. As described above, this streaming video data 54 is compatible with the external rotating storage drive 42 and may be encoded or encrypted.

Proceeding to a step 370, the video data management system 50 routes at least a portion of the streaming video data 54 to the external rotating storage drive 42 via the isochronous interface 40. For embodiments coupled to an internal rotating storage drive and/or to multiple drives, the video data management system 50 selects the portion of the streaming video data 54 to be stored based on the user input 22, the electronic program guide 52, and information regarding the storage capacity of the various rotating storage drives.

We claim:

1. A video recording system to record an external video data stream for a video program segment selected using an electronic program guide, the video recording system comprising:
   a user interface that receives user input;
   a video input interface that receives the external video data stream for the selected video program segment;
   an isochronous interface connectable to an external hard disk drive; and
   a video data management system that:
   uses the electronic program guide to select the video program segment in response to the user input;
   recognizes connection of the external hard disk drive to the video recording system and subsequently identifies the external hard disk drive as available for video data storage;
   uses the external video data stream for the video program segment to provide streaming video data;
   selects at least a portion of the streaming video data to be routed to the external hard disk drive based on user input, an electronic program guide, and information regarding the storage capacity of the external hard disk drive; and routes the selected portion of the streaming video data to the external hard disk drive via the isochronous interface in order to record the external video data stream for the video program segment, wherein the user interface controls playback commands of the video data management system and the playback commands are usable while the external video data stream is being recorded.

2. The video recording system of claim 1, further comprising a set-top box that receives the external video data stream from a multiple-service operator.

3. The video recording system of claim 1, wherein the set-top box comprises an internal hard disk drive.

4. The video recording system of claim 3, wherein the internal hard disk drive is comprises an IDE interface.

5. The video recording system of claim 1 further comprising a personal video recorder that receives the external video data stream.

6. The video recording system of claim 5, wherein the personal video recorder comprises an internal hard disk drive.

7. The video recording system of claim 6, wherein the internal hard disk drive comprises an IDE interface.

8. The video recording system of claim 1, wherein the video data management system automatically recognizes connection of the external hard disk drive to the video recording system.

9. The video recording system of claim 1, wherein the isochronous interface is compatible with the IEEE 1394 standard.

10. The video recording system of claim 1, wherein the external video data stream and streaming video data include video data and audio data.

11. The video recording system of claim 1, wherein the video data management system further comprises a video data encoder that encodes at least a portion of the streaming video data.

12. The video recording system of claim 1, wherein the video data management system further comprises a video data encrypter that encrypts at least a portion of the streaming video data.

13. The personal video recorder of claim 1, wherein the video data management system comprises an internal hard disk drive and routes at least a portion of the streaming video data to the internal hard disk drive.

14. A method of enabling the recording of an external video data stream for a video program segment selected using an electronic program guide, the method comprising:

receiving user input by a video recording system that comprises an isochronous interface connectable to an external hard disk drive;

receiving the external video data stream for the selected video program segment by the video recording system;

using the electronic program guide to select the video program segment in response to the user input;

recognizing connection of the external hard disk drive and subsequently identifying the external hard disk drive as available for video data storage;

using the external video data stream for the video program segment to provide streaming video data;

routing at least a portion of the streaming video data to the external hard disk drive via the isochronous interface in order to record the external video data stream for the video program segment; and controlling playback commands in response to the user input, wherein the playback commands are usable while the external video data stream is being recorded.

15. The method of claim 14, wherein the method further comprises encoding at least a portion of the streaming video data.

16. The method of claim 14, wherein the method further comprises encrypting at least a portion of the streaming video data.

17. The method of claim 14, wherein the method further comprises routing the portion of the streaming video data to either an internal hard disk drive or the external hard disk drive.

18. The method of claim 17, wherein the method further comprises routing the portion of the streaming video data to the external hard disk drive when the storage capacity of the internal hard disk drive is insufficient to accommodate the anticipated size of the portion of the streaming video data to be recorded.

* * * * *